US011317233B2

United States Patent
Koike et al.

(10) Patent No.: US 11,317,233 B2
(45) Date of Patent: Apr. 26, 2022

(54) ACOUSTIC PROGRAM, ACOUSTIC DEVICE, AND ACOUSTIC SYSTEM

(71) Applicant: CLEPSEADRA, INC., Tokyo (JP)

(72) Inventors: Hideki Koike, Tokyo (JP); Homare Kon, Tokyo (JP)

(73) Assignee: CLEPSEADRA, INC., Tokyo (JP)

( * ) Notice: Subject to any disclaimer, the term of this patent is extended or adjusted under 35 U.S.C. 154(b) by 0 days.

(21) Appl. No.: 17/054,462

(22) PCT Filed: May 10, 2019

(86) PCT No.: PCT/JP2019/018746
§ 371 (c)(1),
(2) Date: Nov. 10, 2020

(87) PCT Pub. No.: WO2019/216414
PCT Pub. Date: Nov. 14, 2019

(65) Prior Publication Data
US 2021/0058731 A1    Feb. 25, 2021

(30) Foreign Application Priority Data

May 11, 2018    (JP) .............................. JP2018-092622

(51) Int. Cl.
*H04S 7/00*    (2006.01)
*G06K 9/62*    (2022.01)
(Continued)

(52) U.S. Cl.
CPC ............ *H04S 7/303* (2013.01); *G06K 9/6215* (2013.01); *G06T 11/00* (2013.01); *G10K 15/08* (2013.01); *H04S 2400/15* (2013.01)

(58) Field of Classification Search
CPC ... H04S 7/303; H04S 2400/15; G06K 9/6215; G06T 11/00; G10K 15/08
(Continued)

(56) References Cited

U.S. PATENT DOCUMENTS 6,996,244 B1    2/2006   Slaney et al.
7,856,106 B2 *  12/2010  Bruno ....................... H04S 3/00
                                                    381/1
(Continued)

FOREIGN PATENT DOCUMENTS

CN    108463848 A  *  8/2018  ............. G10L 15/16
EP    2996345 A1      3/2016
(Continued)

OTHER PUBLICATIONS

Kaneko Shoken et al: "DeepEarNet: Individualizing Spatial Audio with Photography, Ear Shape Modeling, and Neural Networks" Audio Engineering Society Conference Paper, Sep. 30, 2016.
(Continued)

*Primary Examiner* — William A Jerez Lora
(74) *Attorney, Agent, or Firm* — Maschoff Brennan

(57) ABSTRACT

An acoustic device includes: an imaging device configured to take a sample image of a space as a sound field and create an image data on the space based on the taken sample image; a sound collector configured to collect a sound generated in the space or to collect a previously-collected acoustic data therein; and a computation part configured to previously compute a plurality of parameters relevant to a coefficient of spatial acoustic filter corresponding to the sample image of the space and previously learn a sound field model of the space shown in the sample image. The computation part is configured to construct a sound field model of the sample image taken by the imaging device or of a previously-taken sample image, from the acoustic data collected by the sound collector, using the coefficient of spatial acoustic filter.

19 Claims, 13 Drawing Sheets

(51) Int. Cl.
*G06T 11/00* (2006.01)
*G10K 15/08* (2006.01)

(58) Field of Classification Search
USPC .......................................... 381/301, 303, 365
See application file for complete search history.

(56) References Cited

U.S. PATENT DOCUMENTS

| | | | |
|---|---|---|---|
| 2015/0149943 A1* | 5/2015 | Nguyen | G06T 7/55 |
| | | | 715/769 |
| 2015/0373477 A1* | 12/2015 | Norris | H04M 1/6033 |
| | | | 381/303 |
| 2017/0064448 A1 | 3/2017 | Kawamura | |
| 2017/0270406 A1* | 9/2017 | Visser | G06N 3/08 |
| 2019/0028829 A1* | 1/2019 | R | G06T 17/00 |

FOREIGN PATENT DOCUMENTS

| | | |
|---|---|---|
| JP | 2006-060610 | 3/2006 |
| JP | 2008-178000 | 7/2008 |
| JP | 2015-60181 A | 3/2015 |
| JP | 2015-61277 A | 3/2015 |
| JP | 2017-050843 | 3/2017 |
| JP | 2017-175503 | 9/2017 |

OTHER PUBLICATIONS

EP Office Action in Application No. 19800558.9 dated Mar. 14, 2022.

* cited by examiner

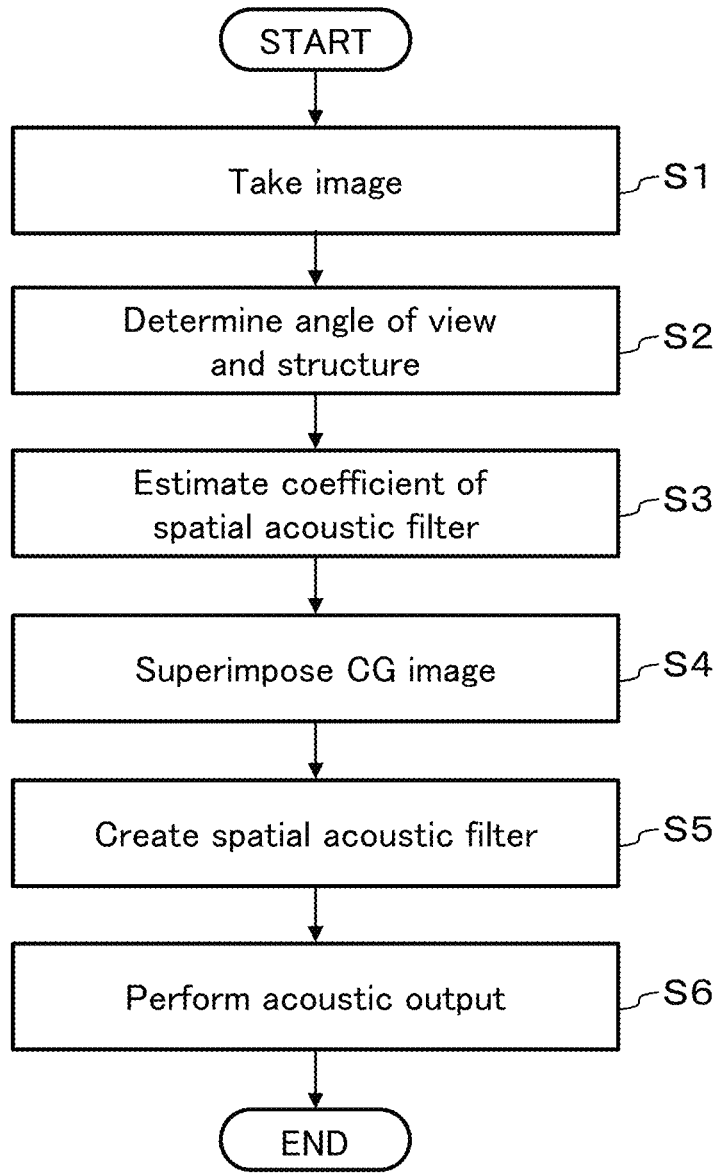

ACOUSTIC PROGRAM, ACOUSTIC DEVICE, AND ACOUSTIC SYSTEM

CROSS REFERENCE TO RELATED APPLICATION

This application is a National Stage Application of PCT/JP2019/018746, filed on May 10, 2019, and which application is incorporated herein by reference. To the extent appropriate, a claim of priority is made to the above disclosed application.

TECHNICAL FIELD

The present invention relates to an acoustic program, an acoustic device, and an acoustic system.

BACKGROUND ART

In the acoustic technology, acoustic systems have been studied these years which can filter a sound and stereophonically reproduce acoustic characteristics such as a reverberation sound (which may also be simply referred to as a reverberation) or the like, unique to a sound field of the sound of interest, such that the sound is heard natural by a listener as if he/she were there (a realistic sensation) (see, for example, Patent Documents 1 to 4).

RELATED ART DOCUMENTS

Patent Documents

[Patent Document 1] Japanese Laid-Open Patent Application, Publication No. 2006-060610
[Patent Document 2] Japanese Laid-Open Patent Application, Publication No. 2008-178000
[Patent Document 3] Japanese Laid-Open Patent Application, Publication No. 2017-050843
[Patent Document 4] Japanese Laid-Open Patent Application, Publication No. 2017-175503

SUMMARY OF THE INVENTION

Problem to be Solved by the Invention

There has been recently developed a technique in which: reflection of a sound is calculated using a 3D space model; acoustic characteristics from the calculated reflection are recorded; and the acoustic characteristics as filter characteristics are used in reproducing a sound field corresponding to the sound.

In the technique, reflection of a sound is required to be calculated using a 3D space model.

In collecting reflection of a sound, especially in an indoor space, different reverberation characteristics in different collected points depending on a structure of a room or the like have a large influence on the reflection of the sound. It is thus necessary to perform such a processing of reconstructing a 3D model from a 2D image, when auralization is performed on a sound field, using ray acoustic modeling or the like. This increases an amount of information for calculating a sound field model, resulting a large amount of computation.

In some cases, meanwhile, a skilled architectural acoustic engineer can obtain acoustic characteristics of a structure of a room, just by looking at it.

In light of the problems described above, the present invention has been made in an attempt to provide an acoustic program, an acoustic device, and an acoustic system, each of which can stereophonically reproduce a sound field model from a 2D image data. The present invention has been made also in an attempt to provide an acoustic program, an acoustic device, and an acoustic system, each of which can easily obtain an acoustic filter of an image data on an unknown space of which parameter is not known. The sound field used herein means a prescribed space of a sound composed of or caused by reverberation, reflection, diffraction, absorption, or the like therein.

Means for Solving the Problem

An acoustic device includes: an imaging device configured to take a sample image of a space as a sound field and create an image data on the space based on the taken sample image; a sound collector configured to collect a sound generated in the space or to collect a previously-collected acoustic data therein; and a computation part configured to previously compute a plurality of parameters relevant to a coefficient of spatial acoustic filter corresponding to the sample image of the space and previously learn a sound field model of the space shown in the sample image. The computation part is configured to construct a sound field model of the sample image taken by the imaging device or of a previously-taken sample image, from the acoustic data collected by the sound collector, using the coefficient of spatial acoustic filter.

Advantageous Effects of the Invention

The present invention can easily reproduce a sound field model from a 2D image data. The present invention can easily obtain an acoustic filter of an image data on an unknown space of which parameter is not known.

BRIEF DESCRIPTION OF THE DRAWINGS

FIG. 3 is a flowchart illustrating an example of an information processing using a program in an acoustic device serving as an encoder in the acoustic system.

EMBODIMENT FOR CARRYING OUT THE INVENTION

Figure 1:
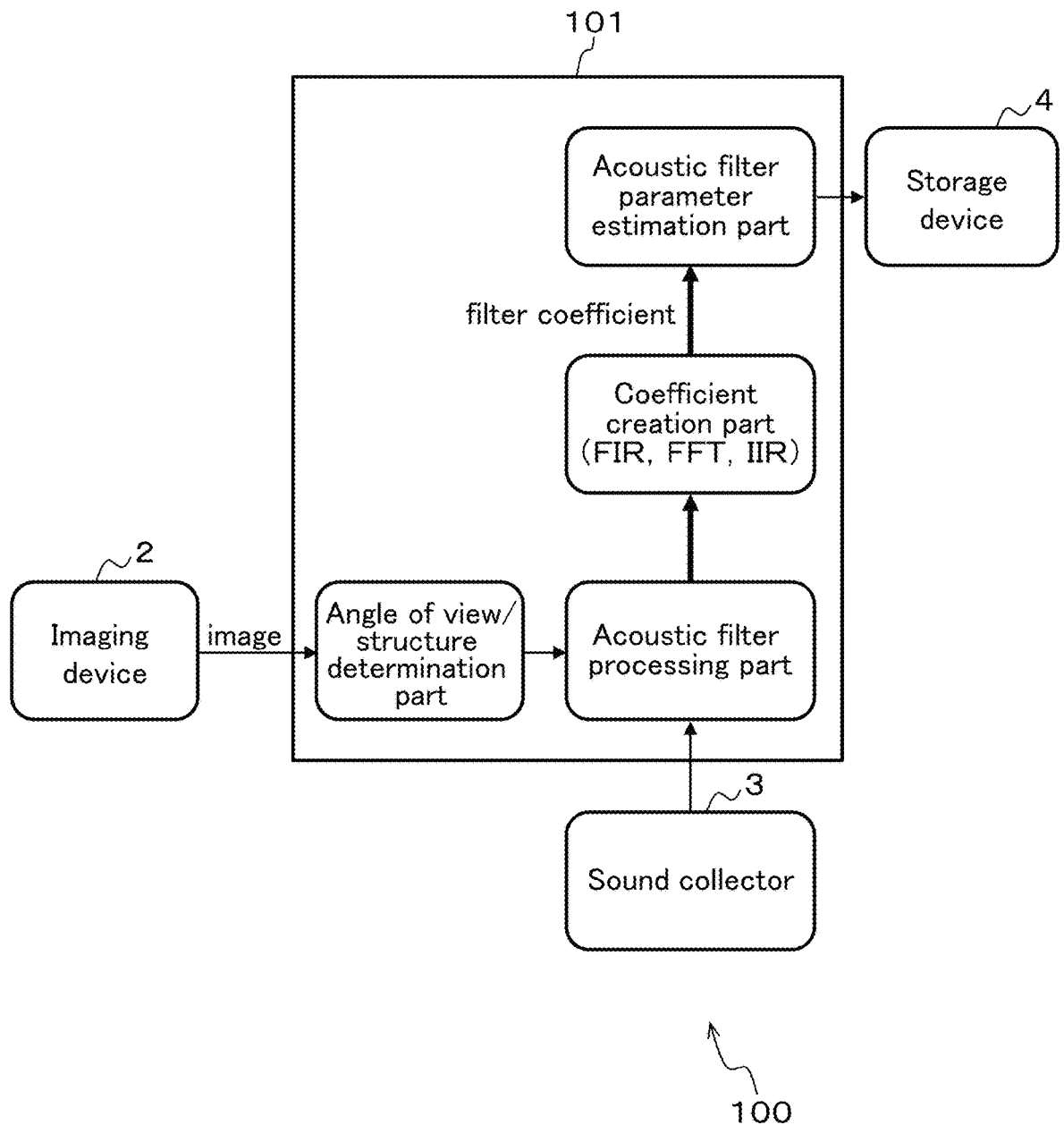
FIG. 1 is a block diagram illustrating a configuration of a acoustic device as an encoder and a decoder in an acoustic system according to an embodiment of the present invention.

An embodiment of the present invention is described in detail with reference to the related drawings. In the explanation, the same reference numerals are given to the same components and description thereof is omitted herefrom.
<Encoder>

An acoustic device 100 illustrated in FIG. 1 includes: a computation part 101 which is mainly realized by a computer; an imaging device 2; a sound collector 3; and a storage device 4, the latter three of which are connected to the computation part 101.

The computation part 101 serves as an encoder and makes an image of an unknown space associate with a coefficient of spatial acoustic filter (which may also be simply referred to as a coefficient). The coefficient of spatial acoustic filter is used for stereophonically reproducing a sound field of an image of which parameter (an amount of characteristics) is not known (which may also be simply referred to as an unknown image).

That is, the computation part 101 previously computes a plurality of parameters relevant to a coefficient of spatial acoustic filter corresponding to a single sample image. The computation part 101 learns respective sound field models of structures shown in a plurality of sample images. In the learning, several tens to several thousands of sample images and respective coefficients of spatial acoustic filter corresponding to the sample images are used.

When the acoustic device 100 serves as an encoder, the acoustic device 100 learns by deep learning (to be described hereinafter). The acoustic device 100 learns a neural network 300 (to be described hereinafter) so as to estimate, for example, an amount of characteristics from characteristics of spatial acoustic filter 400e (to be described hereinafter).

The acoustic device 100 also serves as a decoder which performs a decoding processing of creating an acoustic filter or an acoustic processing.

The imaging device 2 includes an information device as a major component thereof, such as a camera. The imaging device 2 collects 2D sample images (two-dimensional surface images) in an internal space of an architectural structure such as a concert hall and a lecture hall. That is, the imaging device 2: takes an image of a space in a building or any other structure as a sound field; and outputs image data of the taken image to the computation part 101. The imaging device 2 may output image data of a previously-taken sample image to the computation part 101.

The sound collector 3 includes a microphone as a major component thereof. In collecting acoustic data of a sample image, the sound collector 3: is disposed, for example, at a position same as that of an audience seat in a concert hall or any other structure; and collects sound generated in the structure.

The sound collector 3 also collects acoustic echo of the sound generated in the structure by any of the following existing methods, FIR (finite impulse response), FFT (fast Fourier transform), and IIR (infinite impulse response), or any other method.

Herein, the computation part 101 may determine an angle of view and a structure of the sound, so as to estimate a parameter of an image transmitted from the imaging device 2 with more reliability.

This is because, if an image taken in, for example, a concert hall has an enlarged part of a wall or a floor therein alone, it is difficult to estimate an appropriate parameter.

For example, when an image has an enlarged floor, it is difficult to determine whether the image was taken in a concert hall or in a narrow room. If a training image for deep learning has an image of an enlarged floor in the concert hall, there is a possibility that a parameter for a floor in the narrow room is erroneously estimated as that in the concert hall.

In one example of distinguishing by an angle of view and a structure is realized by, for example, floor recognition, wall recognition, and ceiling recognition. In another example, a parameter is estimated only when: at least three of six surfaces of a room imaged in a three-dimensional space is recognized; or a taken image is subjected to depth estimation and a difference in depth equal to or more than a certain value is detected in the taken image.

Or, a taken image may be distinguished by the angle of view and the structure, using a distinguish unit that learns a neural network using a large amount of images which a skillful sound technician has already distinguished as whether or not a parameter estimation of each of the images is possible.

Previously-collected acoustic data associated with a sample image may be inputted into the sound collector 3.

The storage device 4 is realized by a memory or a hard disk drive. The storage device 4 stores therein a sound field model including a coefficient of spatial acoustic filter of a generated acoustic filter in a readable and writable manner.

Description herein is made assuming, an example, that the acoustic device 100 includes the imaging device 2 and the sound collector 3. The imaging device 2 and the sound collector 3 are not, however, indispensable components in the acoustic device 100.

The computation part 101 executes an acoustic program. The acoustic program may be previously installed in the computation part 101 or may be loaded therein. Or, the computation part 101 may be provided on, for example, a cloud server 104 (see FIG. 7) on a cloud to be described hereinafter, and the cloud server 104 may execute part or all of the acoustic program. The acoustic program herein includes an acoustic estimation program or an acoustic synthesis program (a program which includes either an acoustic estimation program or an acoustic synthesis program, or both is hereinafter referred to as an acoustic program).

In order to stereophonically reproduce a sound field, an acoustic program in this embodiment: computes a plurality of parameters relevant to a coefficient of spatial acoustic filter corresponding to a sample image which is a prescribed data on an indoor space in a structure; and learns a sound field model of the structure shown in the sample image.

The acoustic program constructs a sound field model using a sample image stored in the storage device 4.

That is, the acoustic program estimates a coefficient of spatial acoustic filter of an image of an unknown space which has been actually taken by the imaging device 2 and of which parameter is not yet known, using a sound field model of a previously-learned sample image, based on a constructed sound field model.

The acoustic program then applies and adds reverberation data of a sound field model of a sample image approximate to an actual state in a structure in which, for example, a concert is performed, to acoustic data inputted from the sound collector 3.

Figure 2A:
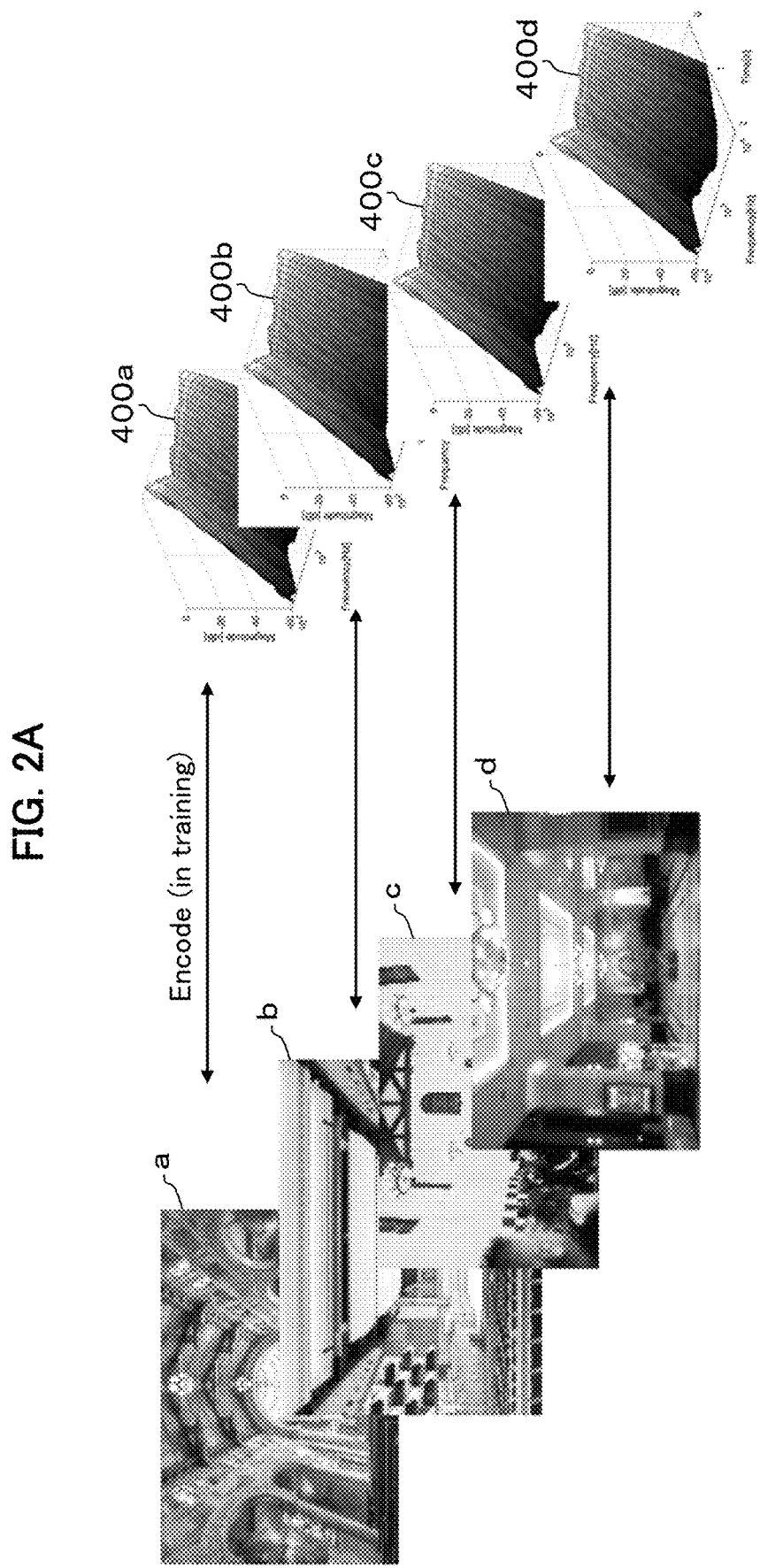
FIG. 2A is a schematic diagram illustrating a state in which image data on a sound field is associated with acoustic data corresponding thereto in training.
Figure 2B:
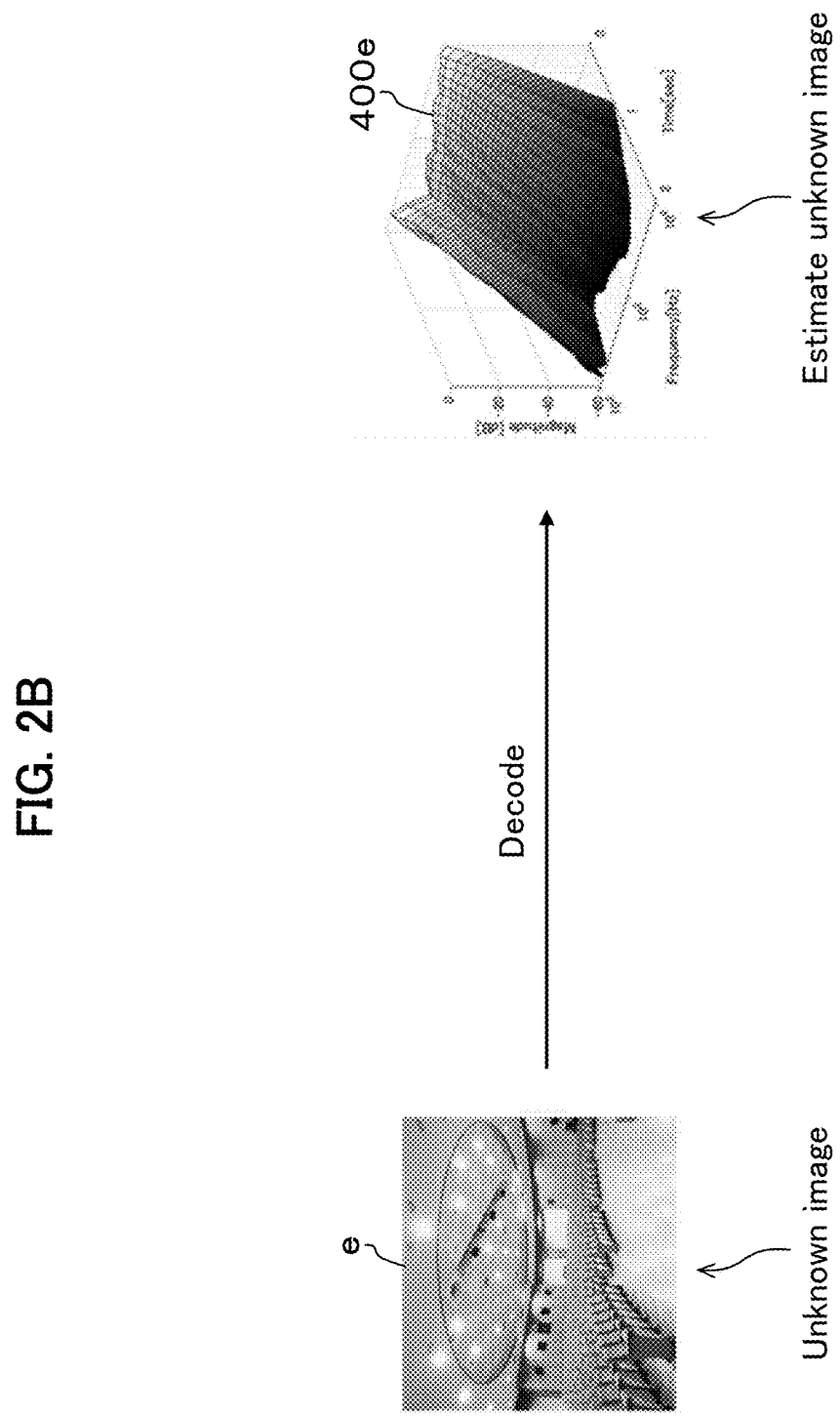
FIG. 2B is another schematic diagram illustrating a state in which image data on a sound field is associated with acoustic data corresponding thereto in training.

FIG. 2A and FIG. 2B are each a schematic diagram illustrating a state in which image data on a sound field is associated with acoustic data corresponding thereto in training. In each of a graph of FIG. 2A and FIG. 2B, the ordinate denotes a magnitude (dB), and the abscissas denotes a frequency (Hz) and a time (sec).

In the acoustic device 100 according to this embodiment, acoustic echoes of a structure shown in each of sample images are sampled into ten ranges by 200 Hz as an octave band.

It is demonstrated that characteristics of spatial acoustic filter (a gradient from an initial value to a value with a 60 dB decrease therefrom) 400a to 400d, each sampled by 200 Hz, are different from each other, depending on respective different structures on sample images a to d.

In training and estimation in deep learning to be described later, image data of a structure can be associated with acoustic data, focusing on that different structures have characteristics different from each other. For example, some of characteristic points of a sample image are: that a high frequency is easily absorbed depending on material of which the structure is made; and that reverberation is affected by a depth of a space, whether or not there is an opening such as a door and a window, or the like.

<Construction of Sound Field Model>

Next are described an encoding processing and a decoding processing performed by the acoustic device 100 with reference to FIG. 2B and FIG. 3 each as a flowchart illustrating the decoding processing.

The acoustic device 100 performs a processing of constructing a sound field model as described below.

In step S1, the imaging device 2 takes a sample image in a structure.

At the same time, the sound collector 3 collects and measures actual acoustic echoes in the structure. The TSP (Time Stretched Pulse) method is used in measuring the echoes, in which a pulse is stretched over time to increase energy thereof.

In step S2, an angle of view and a structure of the image transmitted from the imaging device 2 is determined so as to estimate a parameter of the transmitted image with more reliability.

In step S3, the computation part 201 estimates a coefficient of spatial acoustic filter (a parameter) of the taken sample image. The coefficient of spatial acoustic filter is created by any of the following existing methods, FIR (finite impulse response), FFT (fast Fourier transform), and IIR (infinite impulse response) (see FIG. 1).

In step S4, a CG image created corresponding to the sample image is superimposed on an image of an unknown space which is an actual indoor space. In this example, the CG image shows a concert hall or the like on a side nearer a stage.

In step S5, the computation part 101 creates a spatial acoustic filter. The created acoustic filter and data on a sample image corresponding thereto are stored in the storage device 4 and are used for training in the deep learning to be described hereinafter.

In step S6, the computation part 101 performs an acoustic output to an acoustic output device such as a speaker not shown. The outputted sound based on the created sound field model may be aurally checked. Upon the acoustic output, the processing terminates.

In the acoustic device 100 according to this embodiment as described above, the computation part 101 executes the acoustic program. The acoustic program makes an image of an unknown space associate with a coefficient of spatial acoustic filter for stereophonically reproducing a sound field.

In this embodiment, a plurality of parameters relevant to a coefficient of spatial acoustic filter corresponding to a single sample image are previously computed, to thereby learn a sound field model of a structure shown in the sample image.

Thus, even when data acquired on an inner space of an architectural structure such as an inside of a concert hall, a lecture hall. or the like is only a 2D sample image of an unknown space, an appropriate sound field model can be easily created and reproduced.

The acoustic device 100 in the acoustic system according to this embodiment is described by taking an example in which the acoustic device 100 creates a sound field model using a sample image inputted from the imaging device 2 to the computation part 101.

The present invention is not, however, limited to this. For example, the acoustic device 100 may receive data on a sample image previously taken somewhere else. In this case, a plurality of parameters relevant to a coefficient of spatial acoustic filter corresponding to the inputted data on the sample image are computed, based on which the computation part 101 creates a sound field model of a structure shown on the sample image.

When an actual acoustic echo in a structure is not measured, an acoustic filter corresponding to another structure stored in the storage device 4 is learned in deep learning to be described later. This makes it possible to compute a sound field model including a coefficient of spatial acoustic filter approximate to an acoustic echo in an actual structure.

<Decoder>

Figure 4:
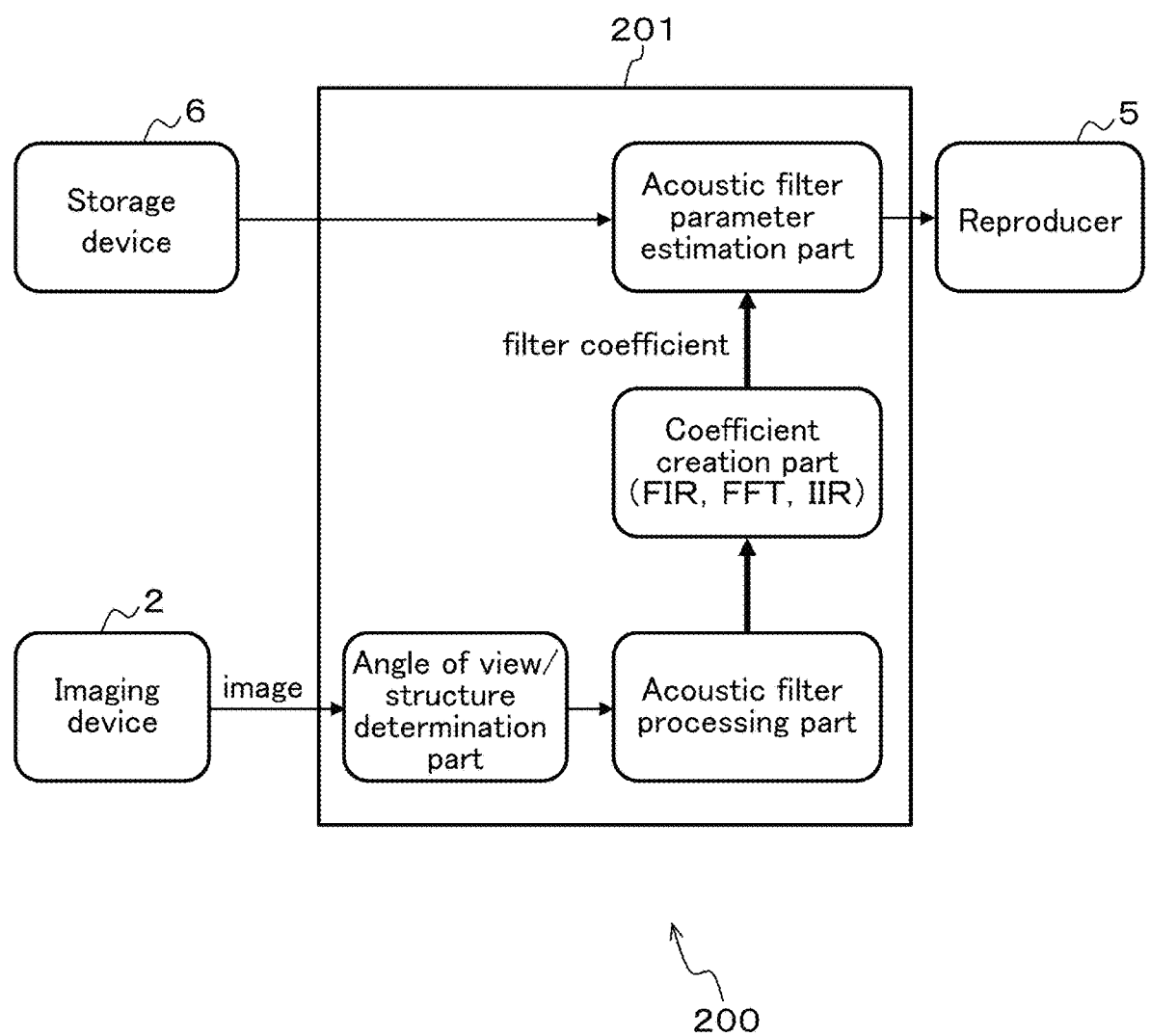
FIG. 4 is a block diagram illustrating a configuration of an acoustic device serving as a decoder in the acoustic system.

FIG. 4 is a diagram illustrating a configuration of an acoustic device 200 in an acoustic system according to this embodiment. In this embodiment, the acoustic device 100 illustrated in FIG. 1 and the acoustic device 200 illustrated in FIG. 4 are provide as two separate and different units. The present invention is not, however, limited to this. For example, an acoustic device of the acoustic system may include a single unit of the computation part 101 or 201. Then, a single acoustic program therein may create a sound field model by means of learning and reproduce sound using the created sound field model.

In this embodiment, description is made focusing on what is different from the acoustic device 100, and description on what is otherwise duplicate is omitted herein by just giving the same reference numerals.

As illustrated in FIG. 4, an acoustic filter processing part of the acoustic device 200 allows an input of data on a sound source or a reproduced sound stored in the storage device 6. The acoustic device 200 includes a computation part 201 to which a reproducer 5 is connected.

The acoustic device 200 serves as a decoder by executing an acoustic program. The acoustic device 200 as the decoder estimates a coefficient of spatial acoustic filter relevant to an image of an unknown space of which parameter is not yet known, using a sound field model of a previously-learned sample image.

The reproducer 5 serves as an acoustic output device. The reproducer 5 as the acoustic output device: makes inputted sound associate with an inputted image, mainly based on the constructed sound field model; applies and adds reverberation characteristics to the associated sound; and outputs the obtained sound. The other configuration is same as or similar to that of the acoustic device 100, description of which is thus omitted herein.

<Deep Learning>

Figure 5:
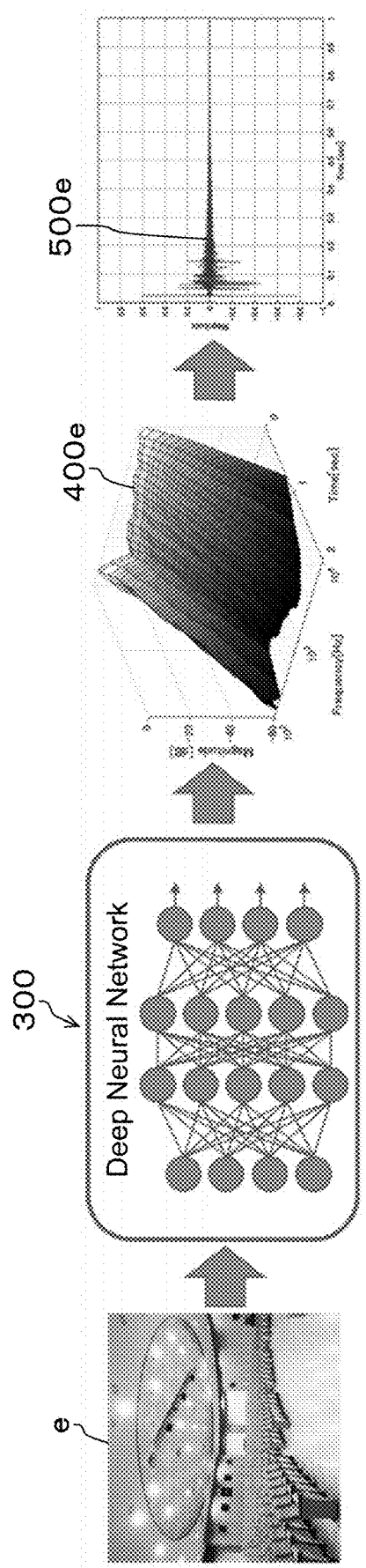
FIG. 5 is a schematic diagram illustrating how a characteristic of spatial acoustic filter is computed, using deep learning in the acoustic system according to the embodiment.

FIG. 5 is a schematic diagram illustrating how a coefficient of spatial acoustic filter is estimated, using a technique of deep learning with multiple convolutional stages which is performed by the computation part 201.

More specifically, when deep learning illustrated in FIG. 5 (second left) is used so as to construct a sound field model, in which four outputs (parameters) are outputted in response to four inputs, a weight of a multiplication is changed by feedback.

That is, if a difference (loss function) between an obtained data and a correct data is large in learning, a parameter of a rear weight coefficient is adjusted by backpropagation. By repeating this, if, for example, a depth has a large influence on reverberation, a weight coefficient is made larger.

In a case where data on a ceiling remains almost the same, a weight coefficient thereof is made to be zero, resulting in that a branch of interest is not used. This improves accuracy of feedback.

On the other hand, in a case of an output of estimating an acoustic filter to be described hereinafter, four inputs are outputted as four outputs (parameters) as they are as vector operations.

The computation part 201 according to this embodiment computes characteristics of spatial acoustic filter (third left in FIG. 5) of an image of an unknown space e (leftmost in FIG. 5), based on a coefficient of spatial acoustic filter relevant to a stored image, using a neural network 300 (second left in FIG. 5).

The neural network 300 is convoluted in multiple stages to perform deep learning with repeated determination and feedback. In the neural network 300, determination starting from an input from left in FIG. 5, to an output rightward and feedback returning to a precedent stage is repeated a plurality of times, in this embodiment, four stages. Characteristics of spatial acoustic filter as a parameter are thereby computed.

In the deep learning, if a sample image which completely corresponds to an image of an unknown space is previously trained, a coefficient of spatial acoustic filter same as that of the sample image is estimated as a relevant coefficient of spatial acoustic filter of the unknown image.

In the deep learning, if there is no previously-learned sample image corresponding to the unknown image e, a coefficient of spatial acoustic filter of a sample image approximate to the unknown image e can be estimated as a relevant coefficient of spatial acoustic filter thereof.

That is, in the deep learning, if there is no previously-learned sample image corresponding to the unknown image e, a coefficient of spatial acoustic filter relevant to the unknown image e can be estimated.

As described above, besides a coefficient of spatial acoustic filter of a learned sample image, a coefficient of spatial acoustic filter different from that of the learned sample image can be obtained in the deep learning.

In the acoustic system according to this embodiment, a reverberation characteristic 500e (rightward in FIG. 5) obtained from the estimated characteristics of spatial acoustic filter 400e is applied and added to a sound inputted together with the unknown image e.

<Estimation of Acoustic Filter>

Figure 6:
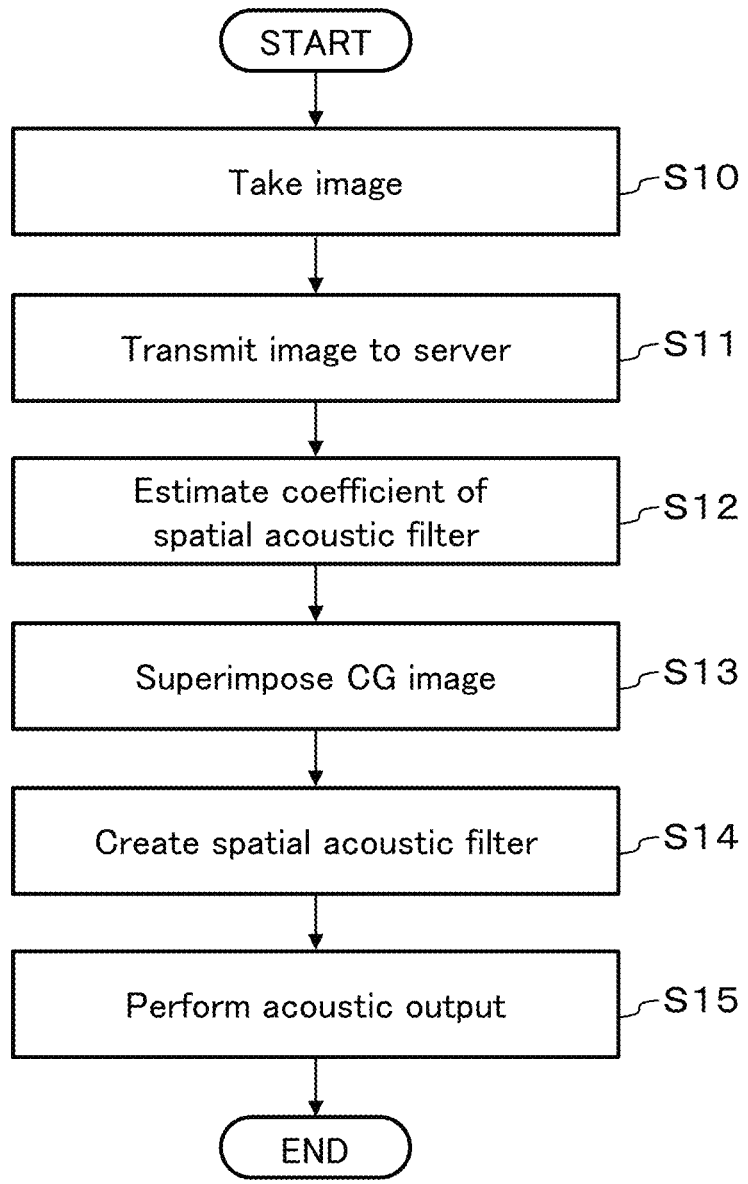
FIG. 6 is a flowchart illustrating an example of an information processing using a program in an acoustic device serving as the decoder in the acoustic system according to the embodiment.

Next is described a decoding processing performed by the acoustic device 200 with reference to a flowchart illustrated in FIG. 6. The flowchart of FIG. 6 illustrates decoding using a cloud.

The acoustic device 200 starts a processing of FIG. 6. In step S10, the imaging device 2 takes an image of an unknown space.

In step S11, image data on the taken unknown image is transmitted to a server. In this embodiment, the server used herein is the computation part 101 and the storage device 4 illustrated in FIG. 1. The present invention is not, however, limited to this. The server used herein may be a cloud server 104 illustrated in FIG. 7 to be described later.

In step S12, a coefficient of spatial acoustic filter corresponding to the unknown image is estimated. The coefficient of spatial acoustic filter is created by any of the following existing methods, FIR, FFT, and IIR, or any other method (see FIG. 4).

In step S13, a CG image created corresponding to a sample image is superimposed on an image of an actual indoor space. In this example, the CG image showing a concert hall or the like on a side nearer a stage is superimposed thereon. This means that a user, while staying at home, can enjoy watching a video and listening to a sound as if the user were in the concert hall or the like on the side nearer the stage.

Figure 7:
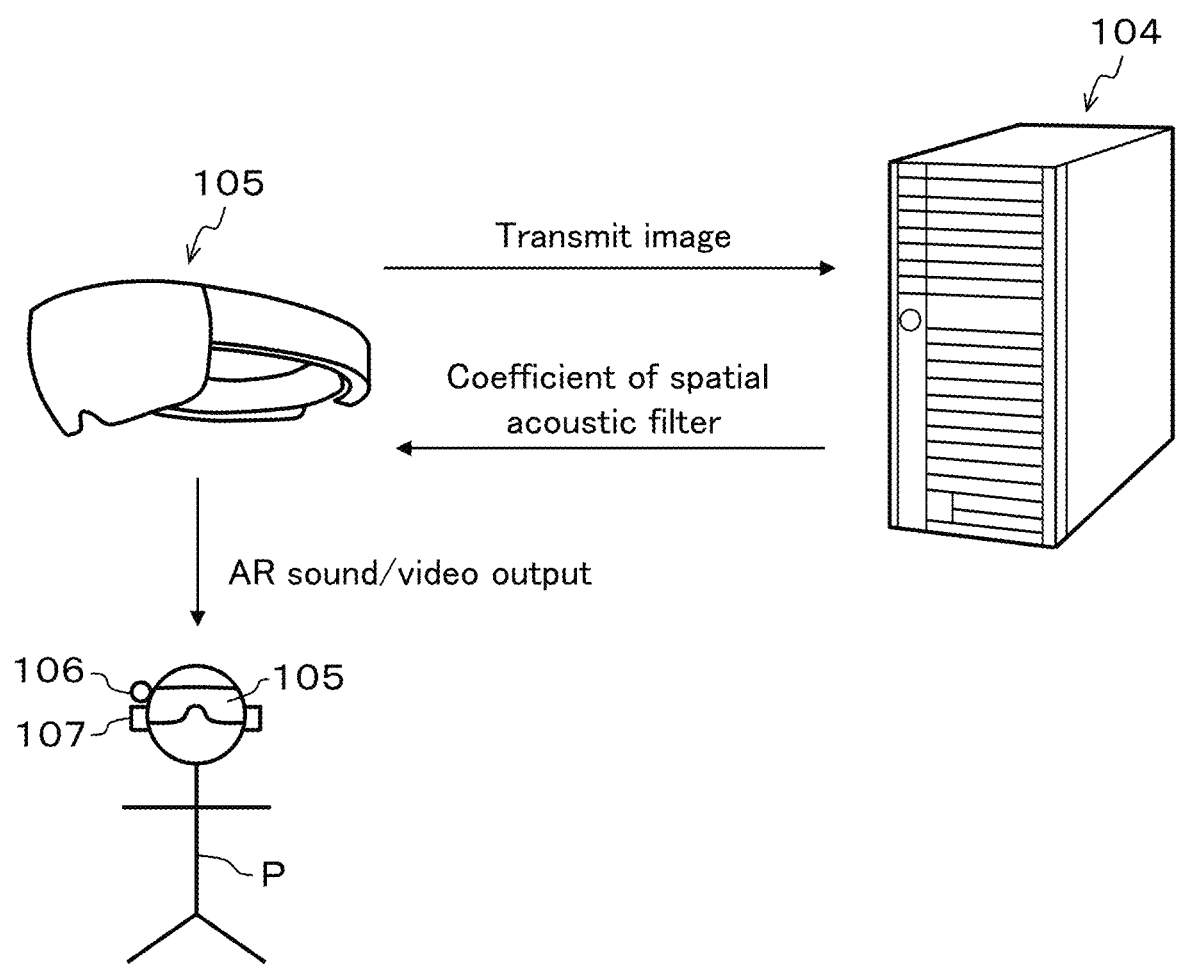
FIG. 7 is a schematic diagram illustrating how a video data based on a sound field constructed by a cloud server is superimposed on an actual space, using the a head-mounted display in the acoustic system according to this embodiment.

Further, as illustrated in FIG. 7 to be described later, an appropriate CG image may be superimposed on an actual indoor space using an AR (Augmented Reality) head-mounted display 105.

In step S14, a spatial acoustic filter is created. The created acoustic filter is stored in the storage device 4 or the cloud server 104 on a cloud. The cloud server 104 constructs an acoustic program, which allows image data and acoustic data therein to be collected from a plurality of imaging devices connected to the cloud.

This makes it possible to store a large amount of image data and acoustic data, to thereby enable improvement in accuracy of learning and estimation.

In step S15, the computation part 201 outputs sound to the reproducer 5 realized by a speaker or the like. After the sound is outputted, the decoding processing terminates.

The acoustic device 200 configured as described above according to this embodiment can easily obtain an acoustic filter corresponding to an image data on an unknown space of which parameter is not yet known.

The acoustic device 200 can estimate an appropriate coefficient of spatial acoustic filter as a coefficient of spatial acoustic filter of the unknown image e. Let us assume a case where the unknown image e is not found in the learned sample images. Even in this case, the computation part 201 can increase an amount of image data or acoustic data in deep learning, based on which an appropriate coefficient of spatial acoustic filter is estimated. Thus, the coefficient of spatial acoustic filter estimated in the computation part 201 is closer to an actual spatial acoustic characteristic, than a coefficient of spatial acoustic filter of a sample image closest to the unknown image e in the learned sample images.

This makes it possible to estimate a further appropriate coefficient of spatial acoustic filter of the unknown image e, compared to a case in which such a coefficient is estimated by just increasing a number of learned sample images.

<Application to Cloud Computing and AR>

FIG. 7 is a diagram illustrating how a video data based on a sound field constructed by the cloud server 104 is superimposed on an actual space, using the AR head-mounted display 105 as an acoustic output device.

For example, by superimposing a video data on a concert hall, on an actual space, such an audiovisual effect can be obtained that a user feels as if he/she actually watches and listens to performance of a player in a concert hall.

Additionally, if the AR head-mounted display 105 is equipped with the imaging device 106, an actual space which a user P looks at can be superimposed on an image projected on a visor, and a stereophonic sound corresponding to a position of a player appearing on the image can be outputted from a headphone.

Part or All of the acoustic system can be used from the cloud server 104 for cloud computing (availability of computer resources supplied as services via the Internet or the like).

In this case, image data and acoustic data can be collected from a large number of information terminals including a plurality of the imaging devices 2 connected to the cloud server 104 via the Internet.

This makes it possible to increase a quantity of acoustic data corresponding to a sample image of a structure, thus allowing a time required for training and estimating reverberation or the like to be reduced. This can improve accuracy of a coefficient of spatial acoustic filter made to be associated with an image of an unknown space.

The other configuration and advantageous effects thereof are same as or similar to that of the embodiment, description of which is thus omitted herein.

As described above, in each of the acoustic program, the acoustic device, and the acoustic system according to this embodiment, the neural network 300 in which deep learning is performed learns a sample image combined with a parameter of a reverberation sound. This makes it possible to estimate characteristics of a sound field from a 2D image as a skilled technician does.

In this embodiment, a sound field model can be easily reproduced from a 2D image data. Thus, compared to usage of a 3D model, processing load on a computer or the cloud server 104 can be reduced.

<Application to Hearing Aid>

Figure 8:
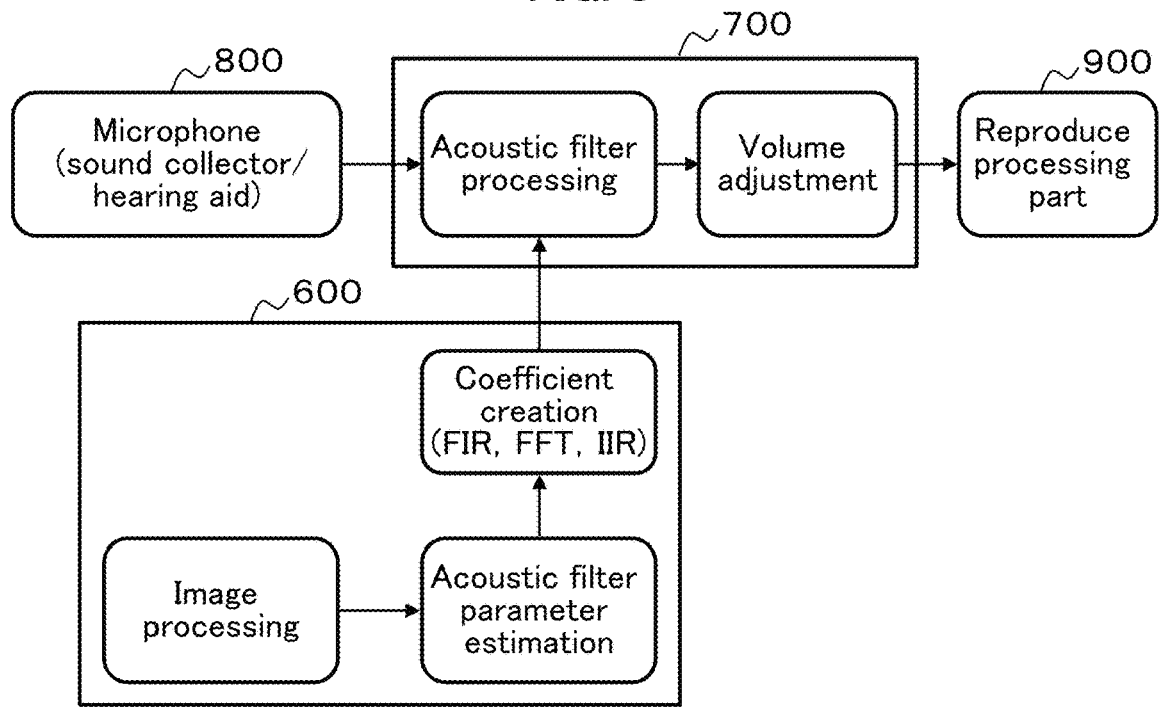
FIG. 8 is a block diagram for explaining an acoustic system applied to a hearing aid according to this embodiment.

FIG. 8 is a block diagram for explaining an acoustic system applied to a hearing aid according to this embodiment.

Hearing aids according to the conventional technology have such a problem that a sound heard with a hearing aid, including audio quality, is adjusted manually, which requires time and labor.

In a case of a sound collect device, a user thereof can adjust sound by himself/herself, using a smartphone application or the like.

It is actually, however, difficult for the user to appropriately adjust such a sound by himself/herself, because there is a frequency which is enhanced in vain due to an effect of fraction or reflection in an outer ear or an ear canal (which may be collectively referred to as a pinna hereinafter). In reproducing natural sound, it is also important to take a relatively well balance between different frequencies. For example, when only a part of the frequencies are enhanced, the obtained sound is heard unnatural.

As illustrated in FIG. 8, an acoustic filter parameter is estimated from a video of an outer ear using an acoustic program installed in a smartphone 600.

For example, one or more of the following is estimated from an image of a pinna: an interfering frequency (a notch frequency, that is, a frequency which becomes a node at a calculated position of an eardrum), an amplitude (a gain), and a width of a frequency (a band width).

Alternatively, one or more of the following is estimated from an image of a pinna: a resonant frequency (a peak frequency, that is, a frequency which becomes an antinode at a calculated position of an eardrum), an amplitude (a gain), and a width of a frequency (a band width).

A coefficient created by FIR, FFT, or IIR is transmitted to a hearing aid body 700. The hearing aid body 700 thereby performs an acoustic filtering to a sound picked up by a microphone 800 as a sound collector.

The sound subjected to the acoustic filtering with a volume or the like thereof adjusted becomes listenable and is reproduced by a reproduce processing part 900 such as an earphone.

Figure 9:
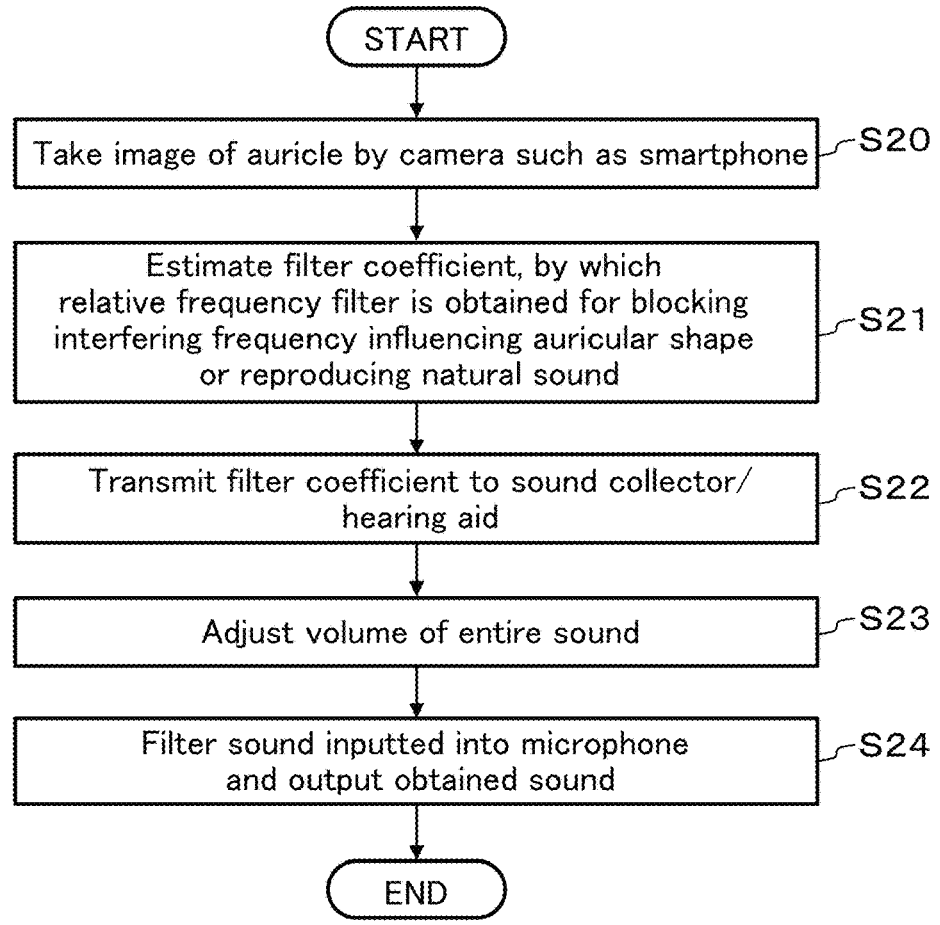
FIG. 9 is a flowchart illustrating an example of an information processing in an acoustic system applied to a hearing aid according to this embodiment.

FIG. 9 is a flowchart illustrating an acoustic system applied to a hearing aid according to this embodiment.

In step S20, as a start of a processing, an image of a pinna is taken by a camera such as the smartphone 600.

In step S21, an influence of reflection or refraction in an ear is estimated from the obtained image. That is, an interfering frequency which has influence on an auriculate form is estimated and is blocked. Or, a filter coefficient by which a relative frequency filter having an influence on an auricular shape is obtained, is estimated and created, so as to reproduce a natural sound.

Thus, the created filter coefficient: passes a frequency bandwidth which efficiently changes listenability when enhanced; and blocks a frequency bandwidth which hardly changes listenability, which is an inefficient frequency bandwidth.

In step S22, the created filter coefficient is transmitted from the smartphone 600 to the hearing aid body 700.

In the acoustic filtering, a volume in a desired frequency bandwidth can be increased or decreased using at least one of an interfering or resonant frequency, an amplitude, and a frequency bandwidth.

In step S23, a volume of an entire sound is adjusted.

In step S24, a sound picked up by the microphone 800 is filtered and is then outputted, which terminates the processing.

As described above, a listenable range can be adjusted using the smartphone 600. This allows a hearing aid to be easily adjusted. Additionally, sound energy can be saved because an inefficient bandwidth is not used. A desired sound volume can be thus obtained by increasing a dynamic range. Further, a sound volume can be adjusted while keeping a natural sound reproduction, because an inconvenient enhancement of only a part of frequencies can be prevented.

The other configuration and advantageous effects thereof are same as or similar to that of the embodiment, description of which is thus omitted herein.

<Application to Dubbing>

Figure 10:
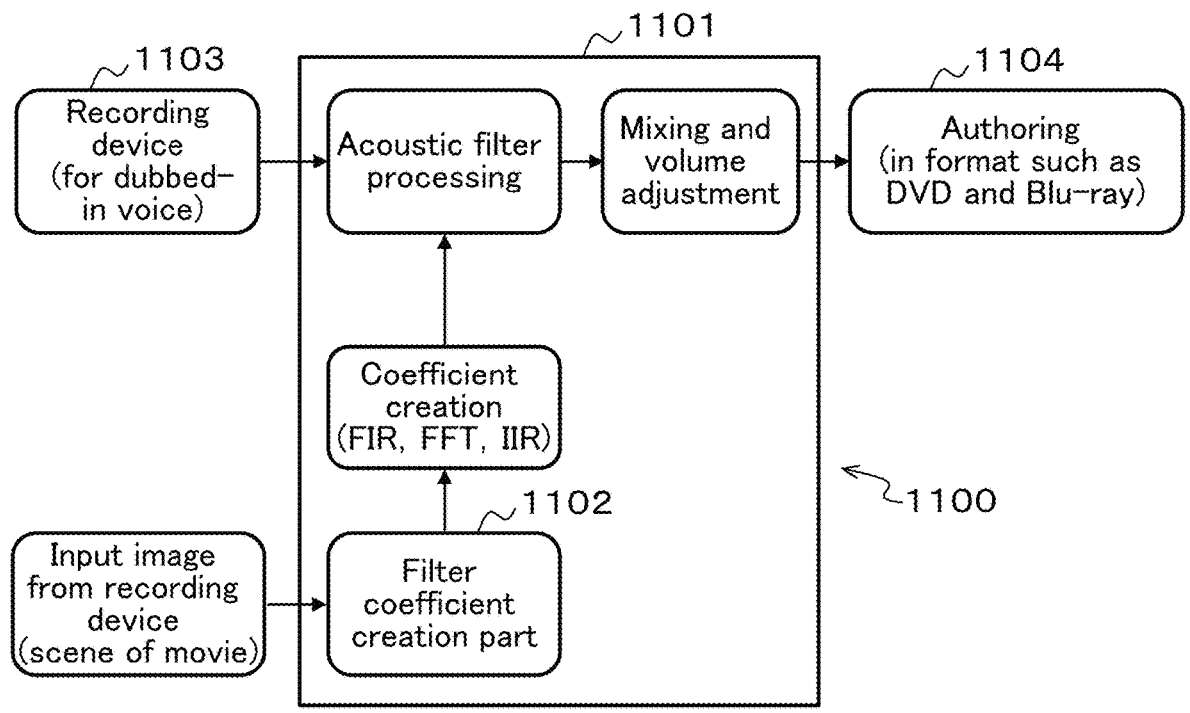
FIG. 10 is a block diagram for explaining an acoustic system applied to dubbing according to the embodiment.

FIG. 10 is a block diagram for explaining an acoustic system applied to dubbing. In general, when video contents such as a movie and a drama are dubbed into a language different from an original one, the contents are imported excluding dialogues and are dubbed in the imported country.

In dubbing, a local sound engineer performs an effect processing of a language into which contents of interest.

One of operations in the effect processing is an operation of adding reverberation to such contents. A level of the reverberation add operation is dependent on a skill of the sound engineer. Also, the reverberation adding operation inconveniently requires a number of complicated working processes.

An acoustic device 1100 illustrated in FIG. 10 includes a computation part 1101, to which are connected: a recording device 1103 into which dubbed-in voice is inputted; and an authoring device 1104 which reads and writes data in format of such a storage medium as a DVD and a Blu-ray (registered trademark).

The computation part 1101 includes a filter coefficient creation part 1102 which estimates a reverberation parameter, as an acoustic program.

Figure 11:
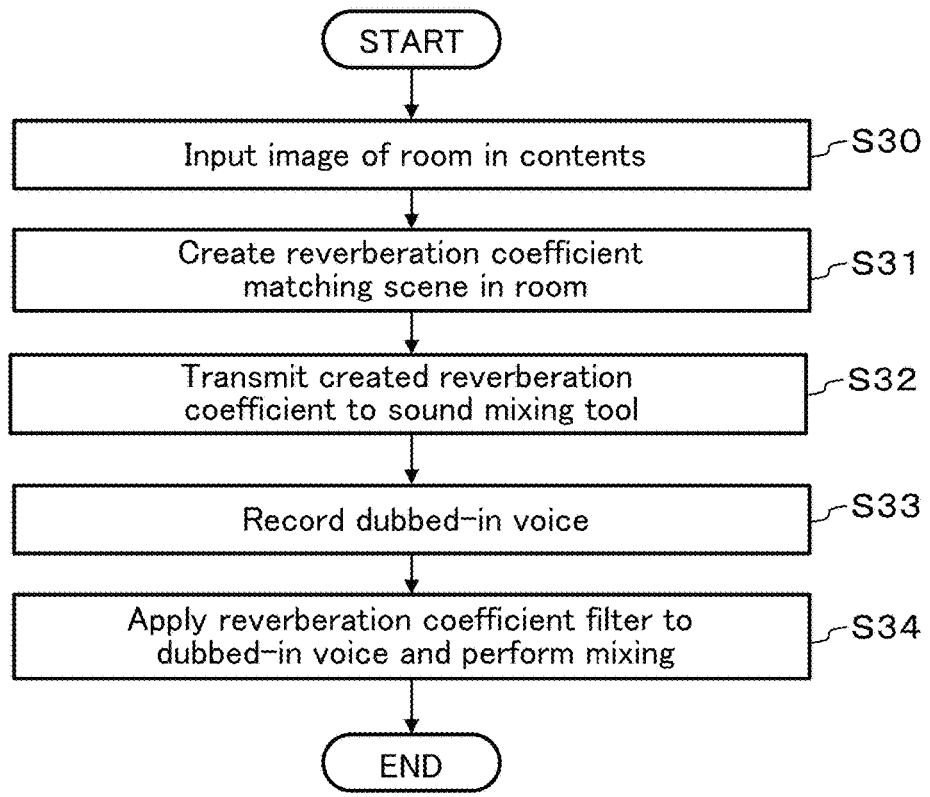
FIG. 11 is a flowchart illustrating an example of an information processing in an acoustic system applied to dubbing according to this embodiment.

FIG. 11 is a flowchart illustrating an acoustic system applied to dubbing according to this embodiment.

In step S30 as a start of a processing, the computation part 1101 allows an input of an image from the recording device 1103. The image herein assumes a movie scene which may be a still image or a moving image.

In step S31, the filter coefficient creation part 1102 creates a spatial acoustic filter coefficient which is a reverberation coefficient matching the movie scene.

In step S32, the computation part 1101 transmits the created reverberation coefficient to a sound mixing tool.

In step S33, the recording device 1103 records a dubbed-in voice.

In step S34, the spatial acoustic filter coefficient is applied to the dubbed-in voice for mixing and volume adjustment. The authoring device 1104 then performs authoring of the dubbed-in voice, of which data is written to a storage medium in a reproducible manner. The processing then terminates.

As described above, in this embodiment, a natural reverberation consistent with a surrounding environment can be added to a dubbed-in voice according to a scene in such contents as a movie and a drama.

This makes it possible to reduce load and working processes performed by a sound engineer.

<Application to Reverberation Processing>

Figure 12:
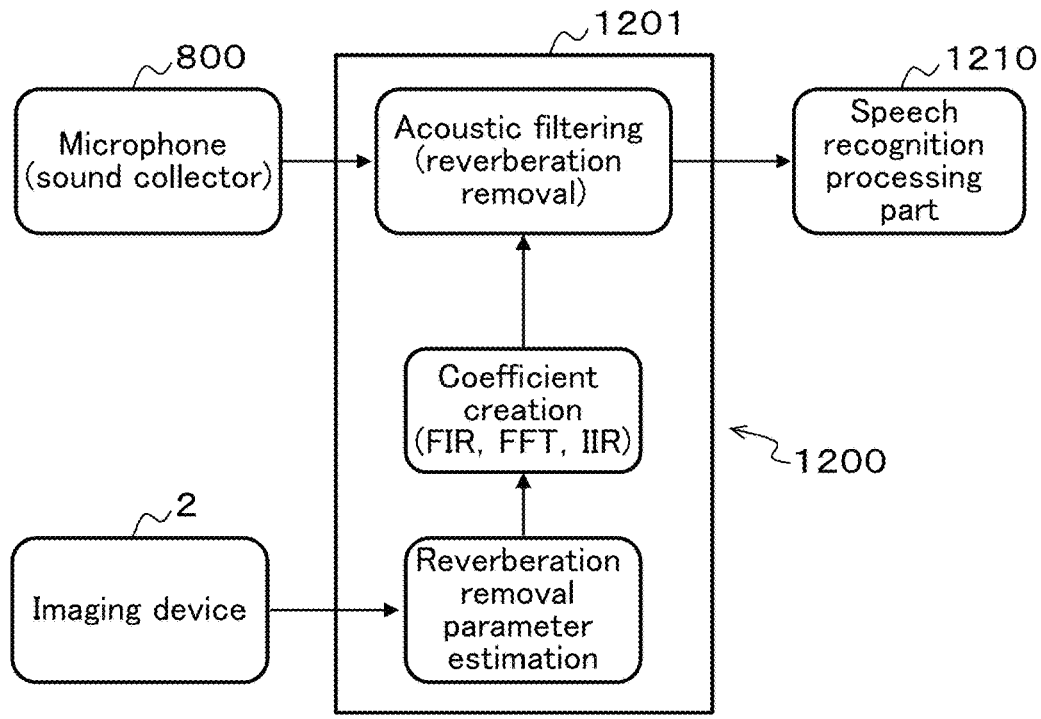
FIG. 12 is a block diagram for explaining an acoustic system applied to a reverberation processing according to this embodiment.

FIG. 12 is a block diagram for explaining an acoustic system applied to a reverberation processing according to this embodiment.

An acoustic system 1200 illustrated in FIG. 12 is a speech recognition system in which: a microphone 800 as a sound collector collects speech; and a speech recognition processing part 1210 recognizes the collected speech and thereby makes a reply or a switch operation of a home appliance.

A reverberation processing is one of key issues in increasing a speech recognition rate of a speech recognition system. An example of the reverberation processing is a technique that: in which direction a speaker is present is estimated, using a plurality of microphones; and directionality of the microphones are appropriately adjusted, based on which unnecessary reflection or reverberation in a direction in which the speaker is not present is removed.

The technique requires, however, a large number of microphones and is not very efficient.

Another technique is known in which a reverberation characteristic is estimated based on an input into a microphone.

The technique can, however, estimate reverberation only when a microphone receives an input in a large volume, and it is difficult to estimate reverberation when there is no sound or a low-level sound.

The acoustic system 1200 illustrated in FIG. 12 according to this embodiment includes a computation part 1201 that allows an input of image data from the imaging device 2.

Next are described a processing performed by the acoustic system 1200 and advantageous effects thereof.

Figure 13:
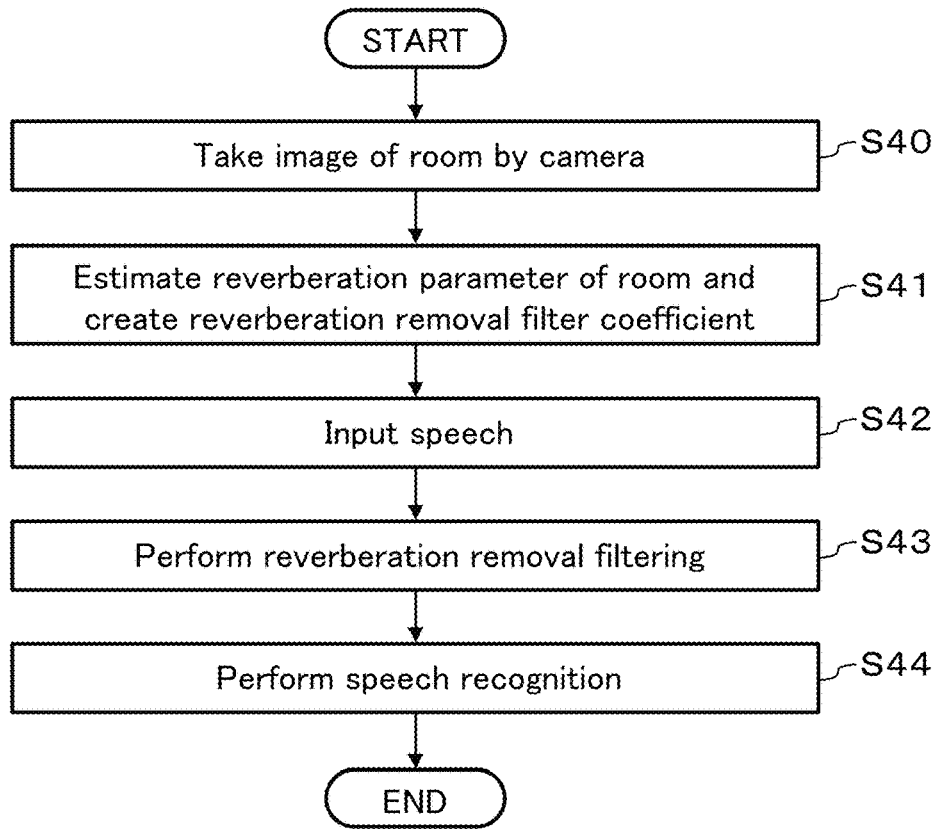
FIG. 13 is a flowchart illustrating an example of an information processing in an acoustic system applied to a reverberation processing according to the embodiment.

FIG. 13 is a flowchart illustrating a processing in an acoustic system applied to a reverberation processing.

In step S40 as a start of the processing, the imaging device 2 (see FIG. 12) takes an image of a room.

In step S41, the computation part 1201 estimates a reverberation parameter of the room, based on image data on the image transmitted from the imaging device 2; and thereby creates a reverberation removal filter coefficient.

In step S42, the microphone 800 picks up a speech of a speaker.

In step S43, the computation part 1201 filters the speech picked up by the microphone 800 by applying a reverberation removal filter to the speech.

In step S44, the speech recognition processing part 1210: performs a speech recognition; and thereby makes a reply or a switch operation of a home appliance. The processing then terminates.

The acoustic system 1200 according to this embodiment estimates a reverberation characteristic from an image, to thereby remove reverberation of a speech. This makes it possible to improve accuracy of a speech recognition system.

<Application to Noise Canceling>

Figure 14:
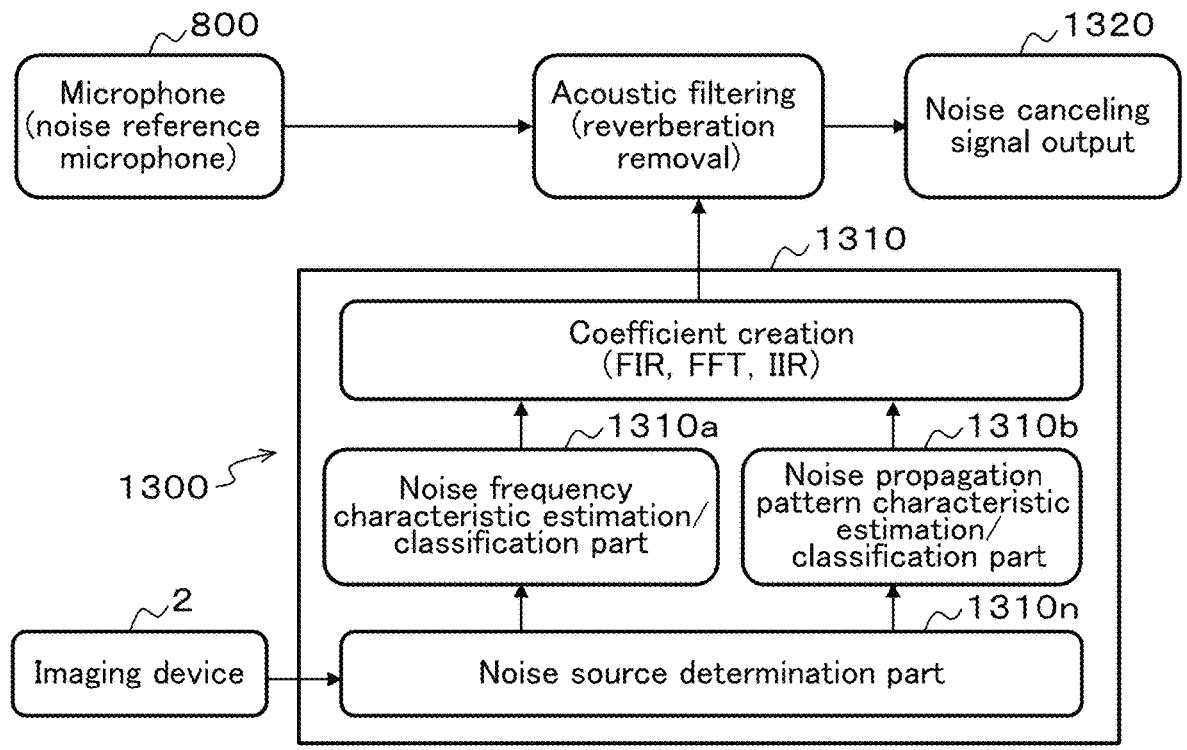
FIG. 14 is a block diagram for explaining an acoustic system applied to noise canceling according to this embodiment.
Figure 15:
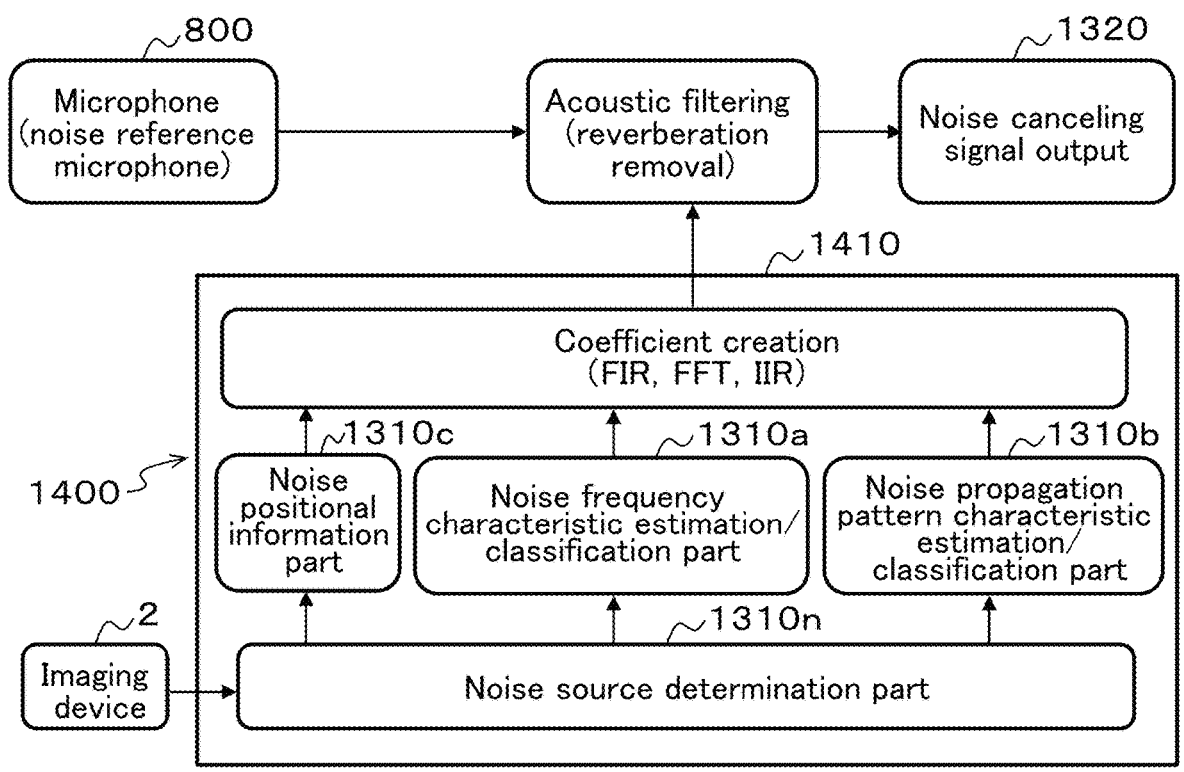
FIG. 15 is a block diagram illustrating the acoustic system applied to noise canceling for canceling a noise from a moving object such as a vehicle. according to this embodiment.
Figure 16:
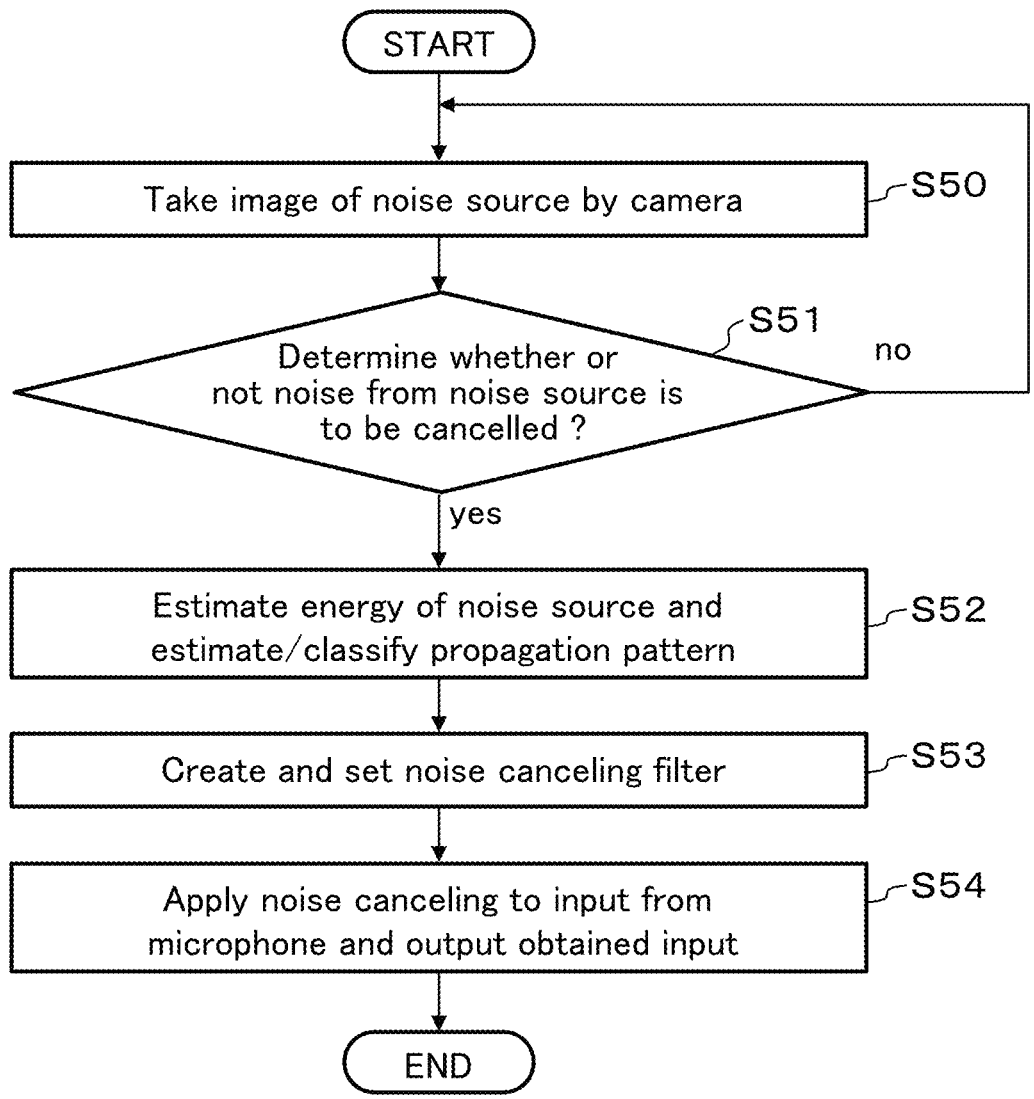
FIG. 16 is a flowchart illustrating an example of an information processing in an acoustic system applied to noise canceling according to the embodiment.

FIG. 14 to FIG. 16 are each a diagram for explaining an acoustic system applied to noise canceling according to this embodiment.

A signal processing method called active noise canceling according to a conventional technology has been known in which a noise is cancelled by outputting a signal having an antiphase to the noise at a prescribed point (a control point).

In the method as described above, a reference microphone collects a noise, and a phase of an output from a speaker is controlled to be inverted to that of the noise before the noise reaches a control point.

The method has, however, such a problem that cancellation of a high frequency with an antiphase is difficult because the higher the frequency, the shorter the wavelength. Thus, assuming a case where the method is used on a train or a plane, an antiphase filter is realized in a limited cancellation range of frequency.

In cancelling a noise generated in a space in a head phone or an earphone is not present, there is a problem as described below.

For example, in order to spatially cancel an unwanted noise, the following is required to be taken into account: a position of a source of the noise; a frequency characteristic (band) thereof; and a propagation characteristic depending on a vibration pattern of the source thereof. The propagation characteristic varies depending on a spherical wave of a point sound source, a plane wave of a line sound source, a plane sound source, or the like.

That is, when not a single type but a plurality of types of noises are required to be cancelled, it is necessary to estimate various patterns from the noises inputted. Thus, there is a possibility that the active noise canceling cannot give a desired noise canceling performance due to a delay caused by the required estimation as described above.

In another case where there is no noise source, no noise canceling signal is required. In order to recognize a noise source by means of a sound, however, it is necessary that any actual sound propagates a reference signal and that a microphone picks up the reference signal, which also causes a delay.

FIG. 14 is a block diagram for explaining an acoustic system applied to noise canceling according to this embodiment.

The acoustic system includes a computation part 1310, to which are connected: a plurality of the microphones 800; and a plurality of speakers 1320.

The computation part 1310 includes: a noise source determination part 1310n which determines a noise source; a noise frequency characteristic estimation/classification part 1310a which estimates and classifies a parameter of a noise frequency characteristic; and a noise propagation pattern characteristic estimation/classification part 1310b which estimates and classifies a propagation pattern of the noise. The computation part 1310 creates a plurality of filter coefficients, using the parameter of the frequency characteristic and the propagation pattern of the noise. A plurality of the speakers 1320 output noise canceling signals based on a plurality of the created filter coefficients.

FIG. 15 is a block diagram illustrating the acoustic system applied to noise canceling of a moving object according to this embodiment. In FIG. 15, in addition to the processing in FIG. 14, a filter coefficient is created taking into account positional information which is information on a position of a moving object from which a noise is generated, using a noise positional information part 1310c.

A plurality of filter coefficients are created herein, taking into account: a position of a source of a noise; a frequency characteristic (band) thereof; and a propagation characteristic depending on a vibration pattern of the source thereof. The propagation characteristic is at least one of a spherical wave of a point sound source, and a plane wave of a line sound source, a plane sound source, or the like. A plurality of the speakers 1320 output noise canceling signals.

The other configuration is same as or similar to that illustrated in FIG. 14.

FIG. 16 is a flowchart illustrating an example of a noise canceling processing.

In step S50 as a start of the processing, a plurality of the imaging devices 2 take respective images of a noise source.

In step S51, the computation part 1310 (1410) determine whether or not a noise from the noise source is to be cancelled. If the noise is determined to be cancelled in step S51 (if yes in step S51), the processing advances to step S52. If the noise is not determined to be cancelled in step S51 (if no in step S51), the processing returns to step S50, in which a plurality of the imaging device 2 take respective appropriate images.

In step S53, a plurality of filter coefficients are created using a parameter of a frequency characteristic of the noise and a propagation pattern thereof, and, where necessary, positional information on the noise source. The taken image may be a moving image. The spatial acoustic filter coefficient is then estimated using a difference between a frame of a moving image, and a background image or a preceding frame.

In step S54, noise canceling is applied to inputs into a plurality of the microphones 800 for noise reference, which are outputted from a plurality of the speakers 1320. The processing then terminates.

In this embodiment, a state or an event as a target of noise canceling is recognized from an image and an appropriate determination is made. A plurality of filter coefficients are prepared using a parameter of a noise frequency characteristic, a propagation pattern of a noise, and, where necessary, positional information on a source of the noise. This makes it possible to further improve accuracy of the noise canceling.

An image is carried by light as a medium and can be captured instantaneously. This makes it possible to start creating a filter coefficient faster than a speed of sound at which the microphone 800 captures a sound.

In this embodiment, an amount of computation can be increased, and performance in a real time can be enhanced.

In this embodiment, when there is no noise source, a signal for noise canceling is not outputted from the speaker 1320. This can save an unnecessary computation processing. Further, because an unintentional signal will not be inputted from the speaker 1320, a risk of generating a harmful effect by a cancelling wave on a surrounding thereof. The other configuration and advantageous effects are same as or similar to those of the embodiment, description of which is thus omitted herein.

The acoustic program, the acoustic device, and the acoustic system according to the embodiments have been described above. The present invention is not, however, limited to those. Various modifications other than those explained above can be made without departing from the scope of the present invention.

For example, the computation part 101 according to the embodiment is provided in a computer constituting a system. The present invention, is not, however, limited to this. The computation part 101 can be provided in, for example, the cloud server 104 as illustrated in FIG. 7.

Or, the neural network 300 may be provided in the cloud server 104, separately from the computation part 101 in the computer. Further, the neural network 300 which performs deep learning therein is not limited to that convoluted in multiple stages according to the embodiment.

For example, any artificial intelligence or program may be used, as long as that can learn and estimate a sound field model using a sample image combined with a parameter of a reverberation sound.

In this embodiment, the acoustic device 100 serving as an encoder and the acoustic device 200 serving as a decoder are provided separately. The present invention is not, however, limited to this. The acoustic device 100 and the acoustic device 200 may be unitarily provided, and a single computation part may be provided serving as both the encoder and the decoder.

In the embodiment, the imaging device 2, the sound collector 3, the storage device 4, and the reproducer 5 are connected to the computation part 101, 201 of the acoustic device 100, 200. The present invention is not, however, limited to this. Any device which can input and output any information may be connected thereto, such as, in particular, a device which can input an image data or an acoustic data by being connected thereto.

In the embodiment, TSP (Time Stretched Pulse) is used as a method of measuring an acoustic echo in a structure. The present invention is not, however, limited to this. Any other method of measuring an acoustic echo of any sound may be used, such as, for example, a measurement method using other impulse, a measurement method using M-sequence, white noise, pink noise, or the like.

In the embodiment, the acoustic device 100 samples an acoustic echo in a structure shown in a sample image by 200 Hz. The present invention is not, however, limited to this. An acoustic echo may be sampled by any other unit, such as an octave and a one third octave.

DESCRIPTION OF REFERENCE NUMERALS

2 imaging device
3 sound collector
4 storage device
5 reproducer (acoustic output device)
100, 200 acoustic device
101, 201 computation part
104 cloud server
300 neural network

The invention claimed is:

1. An acoustic device, comprising:
an imaging device configured to take a sample image of a space as a sound field and create an image data on the space based on the taken sample image;
a sound collector configured to collect a sound generated in the space or to collect a previously-collected acoustic data therein; and
a computation part configured to previously compute a plurality of parameters relevant to a coefficient of spatial acoustic filter corresponding to the sample image of the space and previously learn a sound field model of the space shown in the sample image,
wherein the computation part is configured to construct a sound field model of the sample image taken by the imaging device or of a previously-taken sample image, from the acoustic data collected by the sound collector, using the coefficient of spatial acoustic filter.

2. The acoustic device according to claim 1,
wherein the computation part is configured to: estimate a coefficient of spatial acoustic filter of an image of an unknown space, using the sound field model of the previously-learned sample image; and construct a sound field model of the unknown image, using the estimated spatial acoustic filter coefficient.

3. The acoustic device according to claim 2,
wherein the unknown image is an image of at least one of a pinna of an ear and a canal thereof, and
wherein the computation part is configured to estimate a coefficient of spatial acoustic filter of the ear, based on the image.

4. An acoustic device, comprising:
an imaging device configured to take a sample image of a space as a sound field or to collect an image data on a previously-taken sample image thereof;
a sound collector configured to collect a sound generated in the space or to collect a previously-collected acoustic data therein; and
a computation part configured to previously construct a sound field model of the sample image taken or collected by the imaging device, based on the acoustic data collected by the sound collector, using a coefficient of spatial acoustic filter,
wherein the computation part is configured to estimate a coefficient of spatial acoustic filter of an image of an unknown space, using the previously-constructed sound field model of the sample image.

5. An acoustic device, comprising:
an imaging device configured to take a sample image of a space as a sound field or to collect an image data on a previously-taken sample image; and
a computation part configured to construct a sound field model of the sample image taken or collected by the imaging device, using a coefficient of spatial acoustic filter,
wherein the computation part is configured to superimpose either a previously-taken image, or an image created by computing the previously-taken image in the computation part, on the image taken by the imaging device.

6. The acoustic device according to claim 1,
wherein the computation part is configured to estimate, upon input of an image data and an acoustic data, a coefficient of spatial acoustic filter relevant to the inputted image data; and output the inputted acoustic sound with a reverberation characteristic obtained based on the coefficient of spatial acoustic filter added thereto.

7. The acoustic device according to claim 6,
wherein the acoustic data is a dubbed-in voice of video contents.

8. The acoustic device according to claim 1, further comprising an acoustic output device configured to output an acoustic sound with a reverberation characteristic added thereto.

9. The acoustic device according to claim 1,
wherein the image data is an image data of a moving image, and the spatial acoustic filter coefficient is estimated using a difference between a frame in the moving image and a background image in the frame or between a current frame and a preceding frame.

10. The acoustic device according to claim 1,
wherein a plurality of the imaging devices: are connected to a cloud in which an acoustic program is constructed; and collects an image data and an acoustic data from the program.

11. The acoustic device according to claim 1,
wherein a plurality of the imaging devices: are connected to a cloud in which an acoustic program is constructed; and collects an image data and an acoustic data from the program, and, in the acoustic program, a sound field model of a space is learned and a spatial acoustic filter coefficient thereof is estimated in a neural network convoluted in multiple stages.

12. The acoustic device according to claim 4,
wherein the computation part is configured to estimate, upon input of an image data and an acoustic data, a coefficient of spatial acoustic filter relevant to the inputted image data; and output the inputted acoustic sound with a reverberation characteristic obtained based on the coefficient of spatial acoustic filter added thereto.

13. The acoustic device according to claim 4, further comprising an acoustic output device configured to output an acoustic sound with a reverberation characteristic added thereto.

14. The acoustic device according to claim 4,
wherein the image data is an image data of a moving image, and the spatial acoustic filter coefficient is estimated using a difference between a frame in the moving image and a background image in the frame or between a current frame and a preceding frame.

15. The acoustic device according to claim 4,
wherein a plurality of the imaging devices: are connected to a cloud in which an acoustic program is constructed;

and collects an image data and an acoustic data from the program, and, in the acoustic program, a sound field model of a space is learned and a spatial acoustic filter coefficient thereof is estimated in a neural network convoluted in multiple stages.

16. The acoustic device according to claim 5,
wherein the computation part is configured to estimate, upon input of an image data and an acoustic data, a coefficient of spatial acoustic filter relevant to the inputted image data; and output the inputted acoustic sound with a reverberation characteristic obtained based on the coefficient of spatial acoustic filter added thereto.

17. The acoustic device according to claim 5, further comprising an acoustic output device configured to output an acoustic sound with a reverberation characteristic added thereto.

18. The acoustic device according to claim 5,
wherein the image data is an image data of a moving image, and the spatial acoustic filter coefficient is estimated using a difference between a frame in the moving image and a background image in the frame or between a current frame and a preceding frame.

19. The acoustic device according to claim 5,
wherein a plurality of the imaging devices: are connected to a cloud in which an acoustic program is constructed; and collects an image data and an acoustic data from the program, and, in the acoustic program, a sound field model of a space is learned and a spatial acoustic filter coefficient thereof is estimated in a neural network convoluted in multiple stages.

* * * * *